United States Patent Office 3,164,870
Patented Jan. 12, 1965

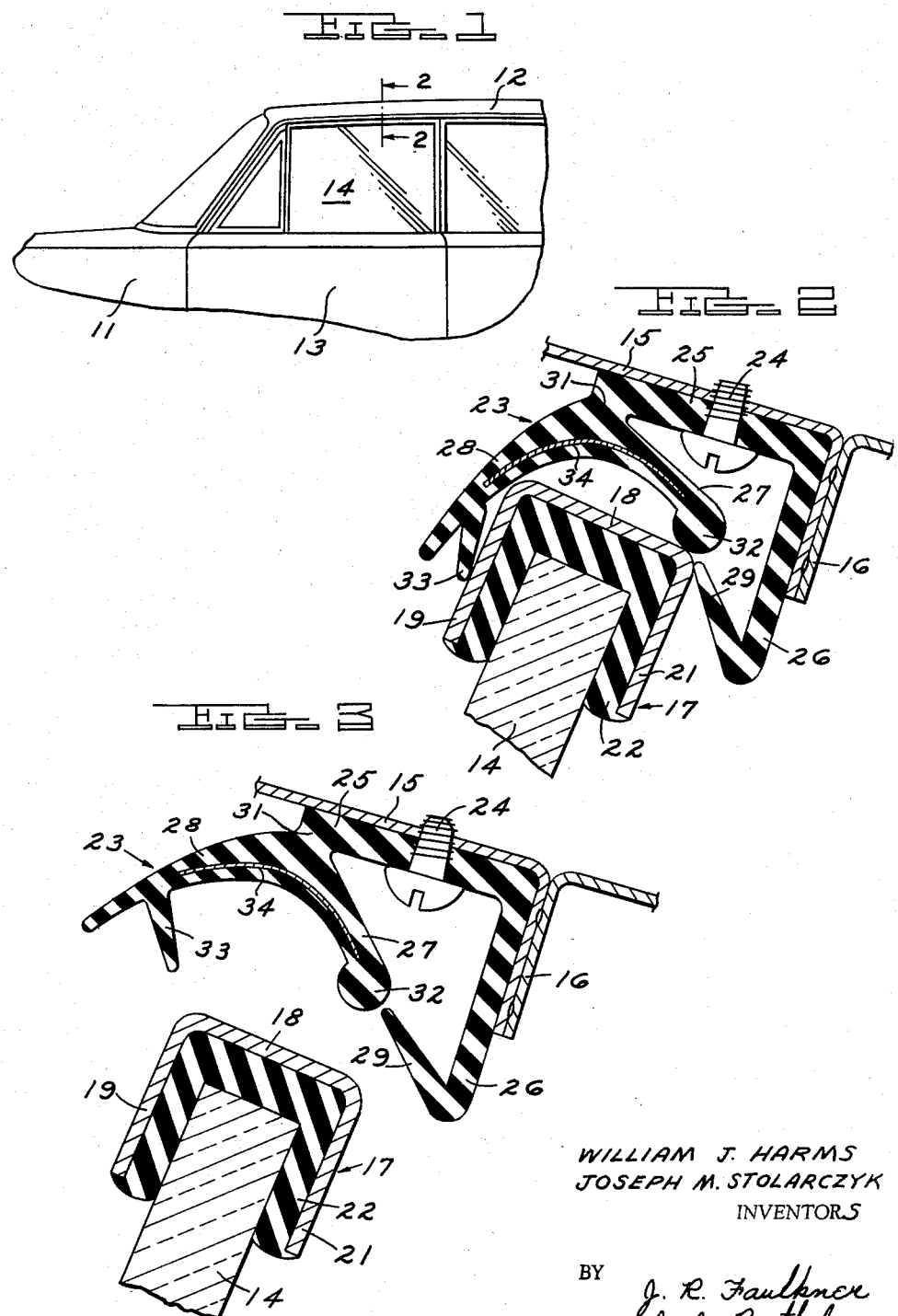

3,164,870
ROOF RAIL WEATHERSTRIP
William J. Harms, Dearborn, and Joseph M. Stolarczyk, Wyandotte, Mich., assignors to Ford Motor Company, Dearborn, Mich., a corporation of Delaware
Filed June 15, 1962, Ser. No. 202,739
2 Claims. (Cl. 20—69)

This invention relates to a weatherstrip or sealing device adapted to close the gap between a body frame member defining an edge of an opening in a vehicle body or the like and a frame member defining an edge of a closure structure movable into and out of said opening.

Passenger vehicles of the convertible type and of the so-called hardtop type are characterized in that the door structures terminate at substantially the vehicle body belt line. This means that the window panels in the door structures are unsupported or unguided above the belt line by a door frame. The window panel itself may be framed, but this frame is relatively thin in cross section and functions primarily as ornamentation and as a glass edge protection device. This frame does not provide a suitable base for a conventional roof rail engaging sealing device.

Accordingly, in convertible and hardtop vehicle constructions the sealing device is usually attached to the roof rail structure. Because the glass panel is unsupported or unguided above the belt line of the vehicle body, there may be an unusual amount of play due to vehicle vibration and there may also be a greater degree of misalignment of the window panel with the sealing device than is found in a conventional construction in which the sealing device is carried on the door frame and is movable into engagement with the vehicle roof rail. Both of these conditions make it extremely difficult to provide an effective sealing action between the window panel edge and the roof rail structure.

The weatherstrip or sealing device embodying the present invention is adapted to be mounted on the roof rail structure of a convertible or a hardtop type vehicle body and is characterized in that it is provided with a plurality of sealing elements which in sealing position encompass three sides of the glass panel frame or edge. This three sided sealing engagement provides an efficient and effective barrier against the entrance of moisture or air leakage through the gap between the window frame and the roof rail structure.

More specifically, the weather strip or sealing device embodying the present invention comprises an elongated resilient member having a base portion adapted to be mounted against the surface of the roof rail structure of a vehicle body and a plurality of sealing elements projecting from said base structure. One of these sealing elements extends from the base and is positioned for sealing engagement with one of the side surfaces of the closure or window frame. At least two other sealing elements extend from said base and at divergent angles thereto. One of these divergent sealing elements is positioned for sealing engagement by an end surface of the closure contiguous to the side surface engaging the first mentioned sealing device. The other of the divergent sealing elements is swingable in response to engagement of the first divergent sealing element by said closure into sealing engagement with a side surface of the closure opposite to its first mentioned side. This results in a sealing action in which the window panel frame or edge is engaged at each of its sides and on its top surface by sealing elements.

Other objects, advantages and features of this invention will be made more apparent as this description proceeds, particularly when considered in connection with the accompanying drawing wherein:

FIG. 1 is a side elevational view of a portion of a passenger car embodying the present invention;

FIG. 2 is an enlarged sectional view taken substantially on the line 2—2 of FIG. 1 illustrating the sealing device or weatherstrip in engaged condition; and FIG. 3 is a view in part similar to FIG. 2 illustrating the sealing device or weatherstrip in unengaged condition.

Referring now to the drawing, there is illustrated a portion of a motor vehicle body 11 having a roof 12 and doors 13 provided with vertically movable windows 14. In the particular vehicle body style illustrated, the doors 13 do not provide outer frames for the windows 14 above the vehicle belt line. Referring to FIGS. 2 and 3, it will be noted that the lower edge of hte roof 12 is provided with a substantially horizontally extending flange 15 terminating at a pinch-weld flange 16. As illustrated, the pinch-weld flange 16 is inwardly of the outer edge of the roof rail section of the vehicle body. Or, with reference to the portion of the window panel 14 shown, the pinch-weld flange 16 lies inwardly of the plane of movement of the window panel as it is raised or lowered within the vehicle door.

The window panel 14 is illustrated as having a metal frame surrounding its peripheral edge, the metal frame comprising a channel, generaly designated 17, having a base portion 18 and outer and inner side walls 19 and 21. The channel 17 is retained and cushioned on the window glass by means of a suitable rubber gasket or a sealing compound 22.

The weatherstrip or sealing device, generally designated 23, embodying the present invention is adapted to be mounted on the underside of the roof rail flange 15 and in abutting relationship to the pinch-weld flange 16. The weatherstrip or sealing device 23 is illustrated as being secured to the flange 15 by mechanical fastening devices 24, although it will be readily understood that the weatherstrip or sealing device may be cemented to the roof rail.

The weatherstrip or sealing device 23 is preferably formed, extruded or molded of an elastomeric material such as a rubber or similar resilient material. It has an elongated, substantially flat or strip-like base portion 25 through which the fastening devices 24 are adapted to project.

A plurality of sealing elements 26, 27 and 28 project from the base portion 25 into the closure opening for engagement by the frame 17 surrounding the peripheral marginal edge of the window panel 14. The sealing element 26 is located at the inner edge of the base 25 and has a cross sectional similarity to the base 25. It extends along the outer surface of the pinch-weld flange 16 and is somewhat wider than the pinch-weld flange so as to project below the lower edge of the flange. It terminates at its free end at an outwardly turned lip 29. The angular relationship of the lip 29 to the sealing element 26 is such that the lip 29 extends in the general direction of the base 25. The lip 29 is adapted to be flexed toward the sealing element 26 upon engagement by the window frame.

The sealing elements 27 and 28 comprise leg portions which extend at divergent angles to the base portion 25. They are connected at their intersection or juncture by a neck portion 31 to the outer edge of the base portion 25. In the disengaged condition of the sealing device, the leg portion 27 extends in a direction substantially in alignment with the lip portion 29 of the sealing element or leg portion 26. The sealing element or leg portion 28 extends at an angle outwardly of the vehicle body and substantially at a right angle to the leg portion 27.

The sealing element or leg portion 27 terminates in an enlarged bead 32. The sealing element or leg portion 28 has an inwardly projecting lip 33 which extends in a direction substantially normal to the inner surface of the sealing element or leg portion 28. Embedded in the divergent sealing elements or lip portions 27 and 28 is a strip 34 of non-elastomeric material, preferably metal of the quality of spring steel, which in cross section has a substantially concave shape so that it extends through the juncture 31 of the two sealing elements or leg portions 27 and 28 for a substantial distance into each sealing element or leg portion. The purpose of this strip 34 will be explained.

FIG. 3 illustrates the appearance of the weather-strip or sealing device when the frame 17 on the window is not in contact with it, either by reason of the window being down or the vehicle door being open. If the window is raised from a lowered position when the door is in a closed condition, the corner of the window frame formed by the intersection of its base 18 and side 21 will move into engagement with the bead 32 on the sealing element or leg portion 27 and the terminal end of the lip 29 on the sealing element or lip portion 26. With the window in fully raised position, as shown in FIG. 2, the terminal end portion of the lip 29 will provide a seal between the surface of the window frame side 21 and the bead 32 will rest on the top of the window frame in close relationship to the terminal end portion of the lip 29. This engagement of the bead 32, however, with the upper surface of the frame 18 results in the sealing element or leg portion 27 being swung toward the base 25 of the sealing device. This swinging movement is reflected in a corresponding swinging movement of the sealing element or leg portion 28, the latter being swung in a counterclockwise direction as viewed in FIG. 2 toward the outer side 19 of the window frame 17. This results in the lip 33 on the sealing element 28 being brought into contact with the outer surface of the window frame. As shown in FIG. 2, the window frame is thus substantially engaged on three sides by the sealing elements or leg portions of the sealing device.

The strip 34 ensures that both sealing elements 27 and 28 move in coordinated movement into sealing engagement with the top and sides of the window frame.

Should the vehicle door be swung to an open position, when the window is raised as shown in FIG. 2, it is readily apparent that the channel structure encompassing the peripheral edge of the window panel will merely abut the sealing element or leg portion 28 to cause the latter to be swung in a clockwise direction as viewed in FIG. 2. The neck portion 31 connecting the leg element 27 and the leg element 28 to the base portion is sufficiently flexible so that the window may tilt the divergent leg or sealing elements sufficiently to pass out from underneath.

Should the window be up when the door is swung from an open to a closed position, there is very little interference between the extremities of the sealing element 28 with passage of the window therebeneath, both the tip end of the leg portion 28 and the tip end of the sealing element lip 33 being sufficiently flexible to let the window frame pass therebeneath. The actual swinging movement of the leg portion 28 into sealing engagement with the outer surface of the window frame will not occur until the upper inner corner of the window frame abuts the bead 32.

It will be understood that the invention is not to be limited to the extact construction shown and described, but that various changes and modifications may be made without departing from the sprit and scope of the invention, as defined in the appended claims.

We claim:

1. A weatherstrip attachable to a vehicle body rail section defining an edge of a body opening receiving a closure,
said weatherstrip comprising an elongated elastomeric member having a base fastenable to rail section,
a leg at one longitudinal edge of said base extending in a direction perpendicular to the latter,
said leg terminating in an angularly related lip extending toward said base,
a flap means consisting of a pair of legs extending in divergent relationship to one another and connected by an integral neck to said base at the other longitudinal edge of the latter,
one of said divergent legs in the unflexed position thereof extending in a general direction of said lip and terminating in a bead,
said bead being spaced from the terminus of said lip,
said bead and said lip being engageable by adjacent corner surfaces of said closure to flex said one divergent leg and said lip toward the intersection of said base and first mentioned leg,
the resistance to such flexure providing weatherseal pressure against said adjacent corner surfaces,
said one divergent leg when flexed by said closure causing the other divergent leg to be swung toward said closure for sealing engagement with a third surface thereof,
and nonelastomeric means embedded in said flap means and extending into each of said divergent legs to cause the latter to be swingable in unison upon engagement of said bead by said closure.

2. A weatherstrip attachable to a vehicle body rail section defining an edge of a body opening receiving a closure,
said weatherstrip comprising an elongated elastomeric member having a base fastenable to rail section,
a leg at one longitudinal edge of said base extending in a direction perpendicular to the latter,
said leg terminating in an angularly related lip extending toward said base,
a flap means consisting of a pair of legs extending in divergent relationship to one another and connected by an integral neck to said base at the other longitudinal edge of the latter,
one of said divergent legs in the unflexed position thereof extending in a general direction of said lip and terminating in a longitudinally extending bead,
said bead being spaced from the terminus of said lip,
said bead and said lip being engageable by the top surface and the inner surface, respectively, of said closure to flex said one divergent leg and said lip toward the intersection of said base and first mentioned leg,
the resistance to said flexure providing weatherseal pressure against said top and inner surfaces,
said other divergent leg having a lip on the side thereof toward said one divergent leg,
said one divergent leg when flexed by said closure causing the other divergent leg to be swung toward the outer surface of said closure for sealing engagement of the lip thereon with said outer surface of said closure,
an a non-elastomeric strip embedded in said flap means and extending from said bead to the lip on said other divergent leg to cause said divergent legs to be swingable in unison upon engagement of said bead by said closure.

References Cited in the file of this patent

UNITED STATES PATENTS

| 2,737,412 | Smith et al. | Mar. 6, 1956 |
| 2,813,748 | Panik | Nov. 19, 1957 |

FOREIGN PATENTS

| 634,860 | Germany | Sept. 5, 1936 |